United States Patent [19]

Häberle

[11] Patent Number: 4,997,560
[45] Date of Patent: Mar. 5, 1991

[54] PLATE FOR A FILTER PRESS

[75] Inventor: Hans Häberle, Neu-Ulm/Holzschwang, Fed. Rep. of Germany

[73] Assignee: Lenser Kunststoff Presswerk GmbH & Co. KG, Senden, Fed. Rep. of Germany

[21] Appl. No.: 406,902

[22] Filed: Sep. 13, 1989

[30] Foreign Application Priority Data

Sep. 15, 1988 [DE] Fed. Rep. of Germany ....... 3831377

[51] Int. Cl.⁵ .............................................. B01D 25/21
[52] U.S. Cl. ..................... 210/228; 210/231; 100/115; 100/211; 100/295
[58] Field of Search ............... 210/225, 228, 229, 231, 210/224, 227, 230; 100/194, 211, 295, 199, 113, 115

[56] References Cited

U.S. PATENT DOCUMENTS 4,776,955 10/1988 Wildner .............................. 210/231
4,839,045 6/1989 Wildner .............................. 210/228

FOREIGN PATENT DOCUMENTS 3220487 12/1983 Fed. Rep. of Germany .

Primary Examiner—W. Gary Jones
Attorney, Agent, or Firm—Herbert Dubno; Andrew Wilford

[57] ABSTRACT

A filter press has at least one support wall and at least one filter element adjacent the wall and in turn having an outer peripheral frame secured to the wall, a generally planar central panel within the frame and having a back face turned toward and forming a compartment with the wall and a front face turned away from the wall, and a deformable connecting web between the panel and the outer periphery and extending at an acute angle to the plane of the panel. The web and frame form a V-shaped groove having a pair of flanks. A filter cloth overlies the front face and a fluid under pressure can be forced into the compartment to press the panel forward and deform the web such that its flanks meet. The web is formed with thickened ridges extending generally parallel to the adjacent frame.

7 Claims, 2 Drawing Sheets

PLATE FOR A FILTER PRESS

FIELD OF THE INVENTION

The present invention relates to filter press. More particularly this invention concerns a plate for such a press.

BACKGROUND OF THE INVENTION

A standard filter press has a plurality of compartments defined between filter plates and each subdivided by a filter cloth or screen into an input compartment and an output compartment. The filter plates have ridged and grooved front surfaces turned toward the filter cloth and forming drainage channels in the output compartment. The filtrate is introduced into the input compartment and the liquid phase is extracted along the channels from the output compartment, with the solid phase of the suspension left on the filter cloth.

In order to clean such a filter the center panels of the filter plates are constituted as membranes and the plates are sufficiently elastic or resilient that these center panels can be pushed toward each other to press the solid phase into a filter cake that can be back flushed or otherwise emptied from the machine. This forward deflection to compress the solid phase is effected by pneumatically or hydraulically pressurizing another compartment formed between the back face of the plate and a relatively rigid support plate located immediately behind each filter plate.

As described in German patent document 3,220,487 the filter plate comprises the relatively thin center panel and a relative thick peripheral frame connected to this panel by a web lying in the plane of the panel. This connecting web is subjected to considerable bending and tension when the back compartment is pressurized and the plate is deformed to pack the solid phase, in particular when the filter is only partly full. As a result it has a short service life so that the plate can be expected to wear out at this location. When there is a central input for the filtrate, it is possible for the filter to fill around this input and not work at all.

OBJECTS OF THE INVENTION

It is therefore an object of the present invention to provide an improved plate for a filter press.

Another object is the provision of such an improved plate for a filter press which overcomes the above-given disadvantages, that is which has a long service life.

SUMMARY OF THE INVENTION

A filter press according to this invention has at least one support wall and at least one filter element adjacent the wall and having an outer peripheral frame secured to the wall, a generally planar central panel within the frame and in turn having a back face turned toward and forming a compartment with the wall and a front face turned away from the wall, and a deformable connecting web between the panel and the outer periphery and extending at an acute angle to the plane of the panel. The web and frame form a V-shaped groove having a pair of flanks. A filter cloth overlies the front face and a fluid under pressure can be forced into the compartment and to press the panel forward and deform the web such that its flanks meet.

Thus in its starting position, that is when the back compartment is not pressurized to compress the filter cake on the filter cloth, the web extends in a direction in which the tension resulting from the pressing operation is effective. Thus there are substantially only tensions in this region, not bending forces. This fatigues the material less and thereby increases its service life. In addition the V-shaped groove sets a limit to any bending stresses of the bend region of the web so as further to limit material fatigue by limiting the radius or curvature that the web may be bent to.

According to another feature of this invention the web is formed with thickened ridges extending generally parallel to the adjacent frame. There are a plurality of such ridges including relatively thick ridges relatively close to the frame and relatively thin ridges relatively far from the frame, and the thick ridges are generally twice as thick as the thin ridges. Such reinforcement limits the bending and also conserves the web.

In accordance with yet another feature of the invention the ridges are separated by spaces including relatively wide spaces relatively close to the frame and relatively narrow spaces relatively far from the frame. The spaces form V-shaped grooves having flanks that meet when the compartment is pressurized.

DESCRIPTION OF THE DRAWING

The above and other objects, features, and advantages will become more readily apparent from the following, reference being made to the accompanying drawing in which.

SPECIFIC DESCRIPTION

Figure 1:
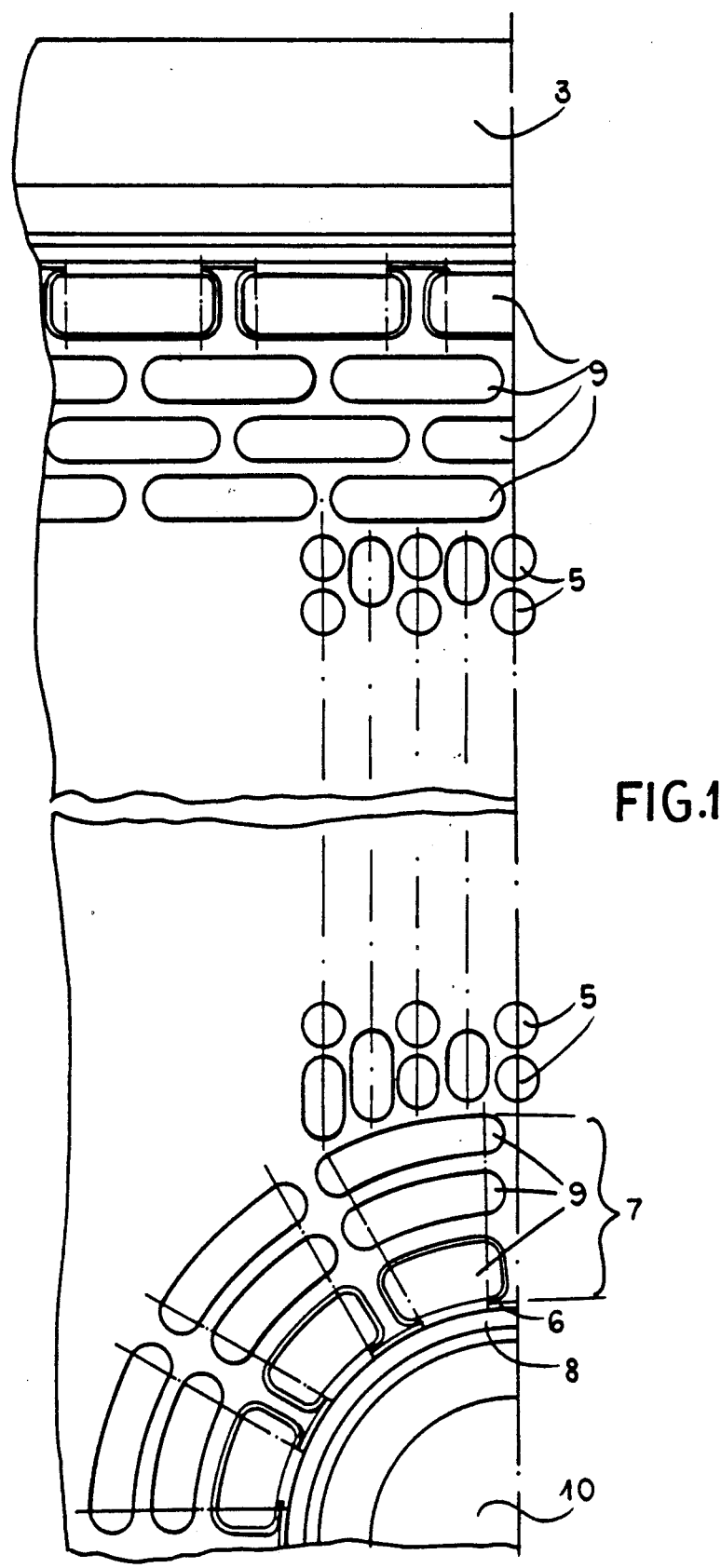
FIG. 1 is a front view of the plate according to this invention.
Figure 2:
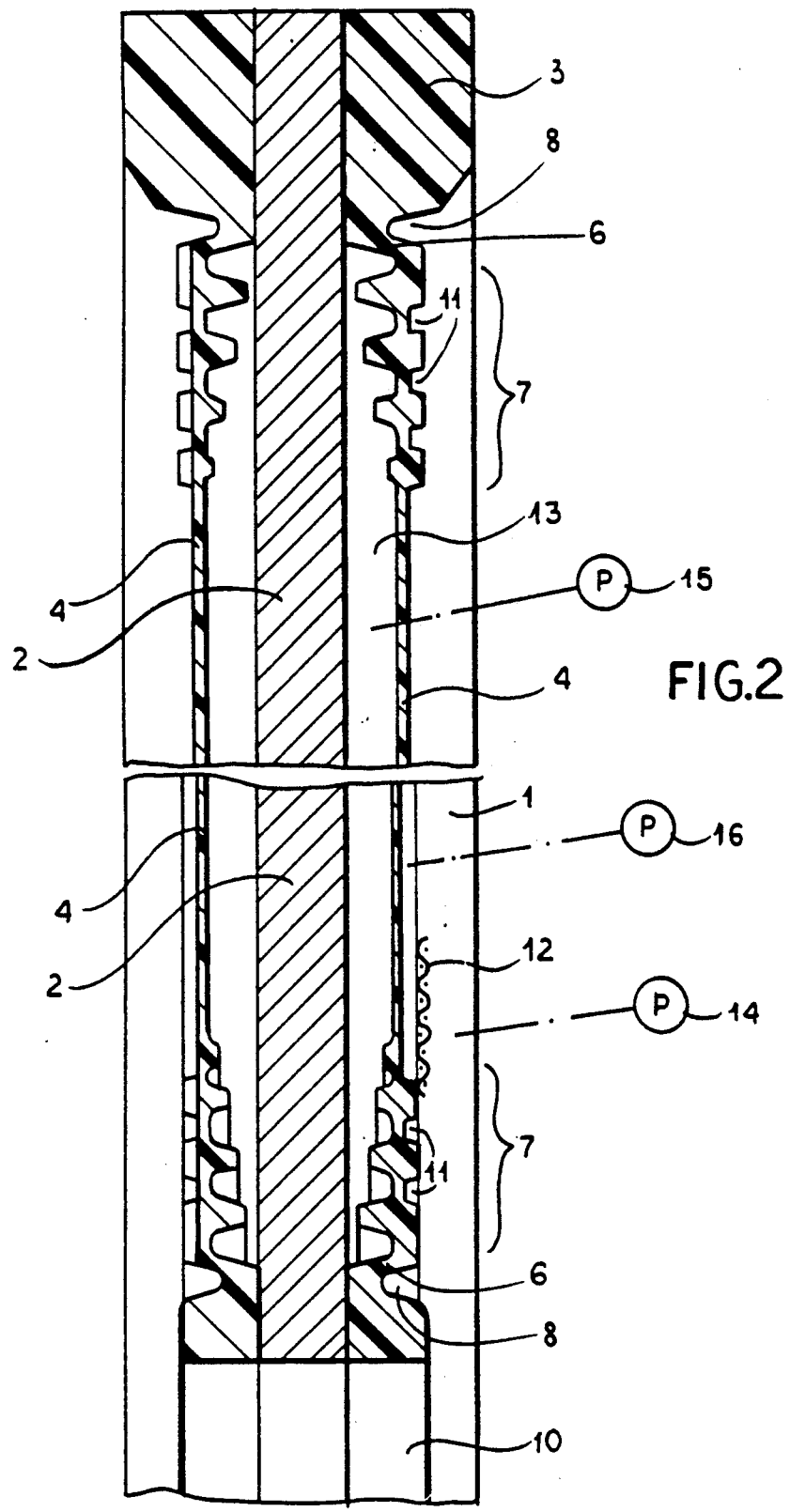
FIG. 2 is a partly diagrammatic section through a filter press using the plate in accordance with this invention.

As seen in FIGS. 1 and 2 a filter press according to this invention has a plurality of filter elements each unitarily formed of a synthetic resin with a relatively thick peripheral frame 3 clamped to a support plate or wall 2 and a relatively thin central panel 4 connected at a bend zone 7 via a web 6 to this frame 3. As shown only in FIG. 1 the central panel 4 is formed on its front face with projections 5 that bear against one side of a filter cloth 12 (shown partially in FIG. 2) in a filter chamber 1. The back face of the panel 4 forms another compartment 13 with the plate 2. A pump 14 can introduce a suspension to be filtered into the compartment 1, a pump 15 can force a fluid into the compartment 13, and another pump 16 can extract the liquid phase of the filtrate from between the screen 12 and the plate 4.

As clearly seen in FIG. 2 the web 6 extends at an acute angle of about 75° to the plane of the center panel 4 and forms with the frame 3 a V-shaped groove 8 whose flanks meet, inhibiting further displacement, when the compartment 13 is pressurized. Thus the shape of this groove limits the maximum bending deformation of this web 6.

Inward of the web 6 the bend zone 7 is formed with thickened ridges 9 of a thickness perpendicular to the plane of the panel 4 that increases outward toward the frame 3. The width of these ridges 9 measured perpendicular to their longitudinal directions and parallel to the panel 4 may also increase outward, also increasing their cross-sectional size. The ridges 9 immediately adjacent the web 6 are about twice as thick as those immediately adjacent the panel 4. Thus these ridges 9 reinforce the bend zone 7 and make it very strong.

In addition these ridges 9 form grooves or spaces 11 of a width measured parallel to the panel 4 that decreases outward toward the frame 3. The flanks of these V-shaped spaces 11 also meet when the panel 4 is bowed outward into the compartment 1 to limit deformation in the bend zone 7.

I claim:

1. A filter press comprising:
   at least one support wall;
   at least one filter element adjacent the wall having
   an outer peripheral frame secured to the wall,
   a generally planar central panel within the frame, centered on a plane, and having a back face turned toward and forming a compartment with the wall and a front face turned away from the wall,
   a bend zone annularly surrounding the central panel and lying generally in the plane of the panel, and
   a deformable connecting web between the bend zone and the outer peripheral frame and extending at an acute angle to the plane of the panel and of the bend zone, the web and frame forming a V-shaped groove having a pair of flanks;
   a filter cloth overlying the front face; and
   means for introducing a fluid under pressure into the compartment and thereby pressing the panel forward and deforming the web such that its flanks meet.

2. The filter press defined in claim 1 wherein the bend zone is formed with thickened ridges extending generally parallel to the adjacent frame.

3. The filter press defined in claim 2 wherein there are a plurality of such ridges including relatively thick ridges relatively close to the frame and relatively thin ridges relatively far from the frame.

4. The filter press defined in claim 3 wherein the thick ridges are generally twice as thick as the thin ridges.

5. The filter press defined in claim 2 wherein the ridges are separated by spaces including relatively wide spaces relatively close to the frame and relatively narrow spaces relatively far from the frame.

6. The filter press defined in claim 5 wherein the spaces form V-shaped grooves having flanks that meet when the compartment is pressurized.

7. A filter press comprising:
   at least one support wall;
   at least one filter element adjacent the wall having
   an outer peripheral frame secured to the wall,
   a generally planar central panel within the frame, centered on a plane, and having a back face turned toward and forming a compartment with the wall and a front face turned away from the wall,
   a bend zone annularly surrounding the central panel and lying in the plane of the panel, and
   a deformable connecting web between the bend zone and the outer peripheral frame and extending at an angle of about 75° to the plane of the panel and to the bend zone, the web and frame forming a V-shaped groove having a pair of flanks;
   a filter cloth overlying the front face; and
   means for introducing a fluid under pressure into the compartment and thereby pressing the panel forward and deforming the web such that its flanks meet.

* * * * *